United States Patent [19]
Cavello

[11] Patent Number: 5,699,226
[45] Date of Patent: Dec. 16, 1997

[54] COMPUTER DOCKING STATION HAVING INTERCHANGEABLE RECEIVERS CONFIGURED FOR DOCKING VARIOUS SIZED PORTABLE COMPUTERS

[75] Inventor: Christopher Cavello, Austin, Tex.

[73] Assignee: Dell U.S.A., L.P., Austin, Tex.

[21] Appl. No.: 600,888

[22] Filed: Feb. 13, 1996

[51] Int. Cl.$^6$ .................... G06F 1/16; H05K 7/10
[52] U.S. Cl. ............................ 361/686; 439/638
[58] Field of Search ............... 364/708.1; 439/638; 361/686

[56] References Cited

U.S. PATENT DOCUMENTS

| | | | |
|---|---|---|---|
| 5,182,698 | 1/1993 | Kobayashi et al. | 361/686 |
| 5,436,792 | 7/1995 | Leman et al. | 361/686 |
| 5,535,093 | 7/1996 | Noguchi et al. | 361/686 |

*Primary Examiner*—Michael W. Phillips
*Attorney, Agent, or Firm*—Haynes and Boone, L.L.P.

[57] ABSTRACT

A docking apparatus for docking selected portable computers, each of the portable computers having a portable computer connector positioned on its rear end. The docking apparatus comprises a base having a first end and a second end, with an electronics enclosure positioned on the base between the first end and the second end. The electronics enclosure has a first end positioned to extend generally perpendicularly from a first side to a second side of the base and generally perpendicularly upwardly from the base to form a wall with a docking apparatus connector being positioned on the wall and configured to matingly engage the portable computer connector. A receiver for at least one of the portable computers is positioned on the base and configured to matingly engage the bottom and the first and second sides of at least one portable computer to position the portable computer for mating engagement of the portable computer connector and the docking apparatus connector. The receiver may be configured as a part of the base of the docking apparatus. The base includes a receptacle and the receiver includes a manual lock which engages the receptacle. Alternatively, the receiver may be formed to be removably positioned on the base of the docking apparatus or by removably positioning attachments which are configured to matingly engage one or more portable computers on the base. The receiver may also comprise a plurality of extendable members which are extendable to engage and support a portable computer in a desired position.

3 Claims, 4 Drawing Sheets

COMPUTER DOCKING STATION HAVING INTERCHANGEABLE RECEIVERS CONFIGURED FOR DOCKING VARIOUS SIZED PORTABLE COMPUTERS

FIELD OF THE INVENTION

The present invention relates generally to computer docking stations and more particularly to a docking apparatus for docking various sized portable computers that have different exterior dimensions and a common portable computer connector.

BACKGROUND OF THE INVENTION

To enable small portable computers such as notebook computers to be used in conjunction with desktop computer peripheral equipment, such as monitors, printers, and the like, structures referred to as port replicators are used. A port replicator is a relatively small device which can be positioned on a desktop or other horizontal work surface and serves as an interface between a portable computer and the desktop peripherals with which it is to be used. Typically, the port replicator includes a housing adapted to rest on a horizontal surface and having a rear side from which a series of connecting cables extend to the selected peripheral equipment. The front side of the port replicator is engagable with the portable computer in a manner so that a connector on the portable computer is engaged with a mating connector on the port replicator to enable the portable computer to utilize the desired peripheral equipment.

However, when the portable computer is removed, the port replicator is a relatively small light device which is susceptible to being pulled off the desk by the weight of the cables connected to it. As a result, other types of docking apparatus have been developed. One such docking apparatus comprises a base having positioned on one end an electronics enclosure which includes the electronics necessary to interconnect the portable computer with the desired peripheral equipment. The electronics enclosure may also include a cable cover to cosmetically cover the cable connections. On the other end, a receiver is positioned to matingly engage the bottom and sides of a portable computer so that it may slide into mating engagement with the docking apparatus. Mating engagement is achieved by moving a connector positioned on a rear end of the portable computer into engagement with a connector positioned on the docking apparatus so that the portable computer is matingly engaged with the docking apparatus in operable electrical contact for use with the desired peripheral equipment. The portable computer display screen can be raised and the portable computer can be used while docked in contact with the peripheral equipment. Further, the docking apparatus may include fittings for engagement with a monitor stand so that the docking apparatus with the docked portable computer can be stored under the monitor stand when the portable computer display screen is closed.

In many instances, peripheral equipment in a particular office may be used by a number of users. Various users of the peripheral equipment may have portable computers which are of different models, different capabilities and the like, but of a common family of portable computers. Such a family of portable computers can be designed to have a portable computer connector which is common to all members of the family of portable computers. Because of the different capabilities which may be included in some of the portable computers, the different configurations of different models and the like, the portable computers may not all be readily mated with a single docking apparatus because the receiver is not configured to position the portable computer properly for mating engagement of the portable computer connector with the docking apparatus connector. As a result, a different docking apparatus is required for each portable computer having a different configuration. In addition, a different docking apparatus is typically required when a user upgrades to a portable computer having increased functionality due to differences in size of the computer and in the positioning of the portable computer connector.

What is needed, therefore, is a system whereby users of various sized portable computers can dock their portable computers at the same docking station. The foregoing is especially desirable in environments where different sized portable computers from a common family of computers, having a common portable computer connector, are used.

SUMMARY OF THE INVENTION

The present invention, accordingly, provides an apparatus for docking various sized portable computers at the same docking station that overcomes or reduces disadvantages and limitations associated with prior systems.

The invention provides an apparatus for docking selected portable computers of a family of portable computers, each of the portable computers having a front end and a rear end, a first side and a second side, a top and a bottom, and a portable computer connector positioned on the rear end of the portable computer.

The docking apparatus comprises a base having a first end and a second end and an electronics enclosure positioned on the base between the first end and the second end, the electronics enclosure having a first end positioned to extend generally perpendicularly from a first side to a second side of the base and generally perpendicularly upwardly from the base to form a wall. A docking apparatus connector is positioned on the wall and configured to matingly engage the portable computer connector. A receiver is positioned on the base and configured to matingly engage the bottom and a first and a second side of at least one portable computer to position at least one portable computer for mating engagement of the portable computer connector and the docking apparatus connector.

The receiver may be configured as a part of the base of the docking apparatus. Alternatively, the receiver may be formed to be removably positioned on the base of the docking apparatus. Further, the receiver may be formed by removably positioning a plurality of attachments which are configured to matingly engage one or more portable computers on the base. The receiver may also comprise a plurality of extendable members which are extendable to engage and support a portable computer in a desired position.

DESCRIPTION OF PREFERRED EMBODIMENTS

Figure 1:
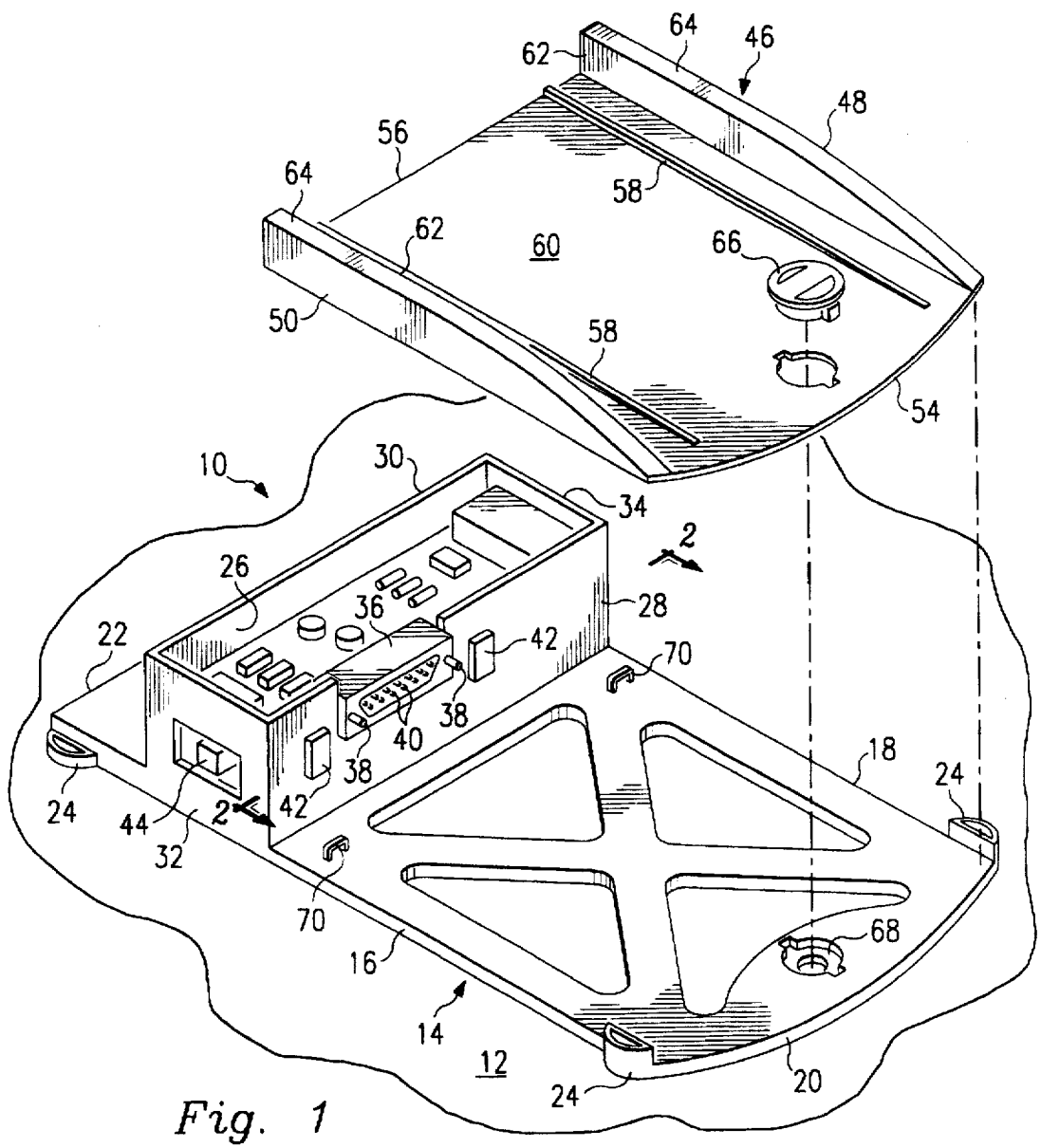
FIG. 1 is an exploded, perspective view of a docking apparatus of the present invention.

In FIG. 1, the reference numeral 10 refers to a docking apparatus of the present invention resting on a surface 12. The docking apparatus 10 comprises a base 14 having a side 16, a side 18, a front end 20 and a rear end 22. The base 14 may be formed, as shown, as a framework or as a solid member. Fittings 24 are optionally provided on the base 14 for mounting a monitor stand (not shown) above the docking apparatus 10. An electronics enclosure 26 is provided which includes the electrical components necessary to achieve electrical connection of a portable computer with peripheral equipment or the like and other functionalities not available in the portable computer enclosure. The electronics enclosure 26 includes a front end 28 and a rear end 30, and is connected by cables (not shown) to peripheral equipment and the like. The electronics enclosure 26 also includes a side 32 and a side 34. End 28 is formed as a wall which supports a connector 36 which includes guide pins 38 and connector pins 40. Ejectors 42 are positioned on end 28 to eject portable computers from engagement with connector 36 when desired. Ejectors 42 may be mechanical or electromechanical and are operated by a switch or lever 44, shown on the side 32 of the electronics enclosure 26.

A receiver 46 having a side 48, a side 50, a front end 54, and a rear end 56, is positioned for mounting on the base 14. The receiver 46 includes rafts 58 which may be positioned on a floor 60 of the receiver 46 and optionally on inner walls 62 of sidewalls 64 of the receiver 46 to facilitate sliding a portable computer into the receiver 46. The receiver 46 as shown is maintained in position on the base 14 by a manual lock 66 positioned on the receiver 46, and adapted for engagement with a receptacle 68 positioned on the base 14 to maintain the receiver 46 in place. Slots 70 are provided on the base 14, to receive tabs (not shown) on the receiver 46 to further secure the receiver 46 in position on the base 14.

Figure 2:
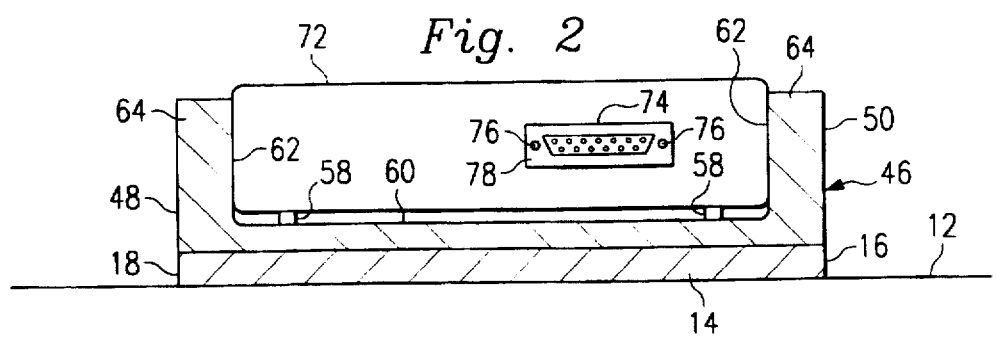
FIG. 2 is an end view from section line 2—2 of FIG. 1 of a receiver positioned on the base of the docking apparatus showing the positioning of a portable computer supported therein.

As shown in FIG. 2, a portable computer 72 is positioned in the receiver 46 positioned on the base 14. The portable computer 72 has a portable computer connector 74 positioned on its rear end and is positioned between the sidewalls 64 for mating engagement of the connector 74 with the connector 36. The connector 74 contains receptacles 76 for the guide pins 38 and receptacles 78 for the connector pins 40. The pins and receptacles could be reversed between the connector 36 and the connector 74.

By the use of a plurality of receivers 46 adapted to receive different portable computers by varying the width of the sidewalls 64 and the height of the rails 58 to matingly engage with the sides and bottom of the portable computer to position the portable computer connector 74 in position for mating engagement with the docking apparatus connector 36, a large number of portable computers from a common family of portable computers can be docked in the same docking apparatus.

Figure 3:
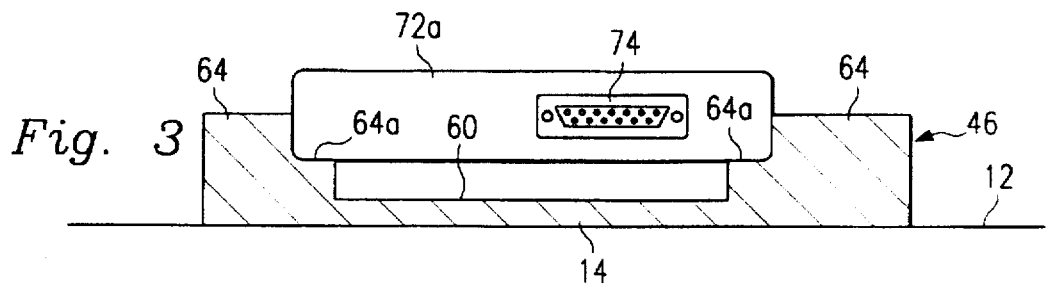
FIG. 3 is an end view of an alternative receiver taken from the position of section line 2—2 of FIG. 1 that is formed as a part of the base showing a portable computer supported therein.
Figure 4:
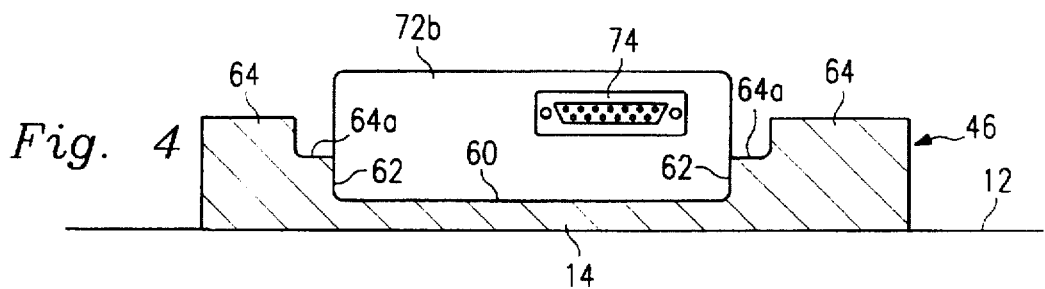
FIG. 4 is an end view of the receiver of FIG. 3 taken from the position of section line 2—2 of FIG. 1 showing a different portable computer supported therein.

FIGS. 3 and 4 disclose an alternate embodiment of the present invention wherein the receiver 46 is formed as a part of the base 14. In the embodiment shown in FIGS. 3 and 4, the same receiver 46 is adapted to support two portable computers 72a and 72b. The sidewalls 64, as shown, are adapted to matingly engage the sides and bottom of the portable computers 72a and 72b for mating engagement of the connector 74 with the connector 36. Each of the sidewalls 64 includes a bearing surface 64a which supports the bottom of the portable computer 72a.

Alternatively, the portable computer 72b having a different exterior configuration can be supported in receiver 46, as shown in FIG. 4. Inner walls 62, formed as a part of the sidewalls 64, engage the sides of the portable computer 72b, and floor 60 engages the bottom of the portable computer 72a. Either of two portable computers can thus be placed in a position for mating engagement of the connector 74 with the connector 36.

Figure 5:
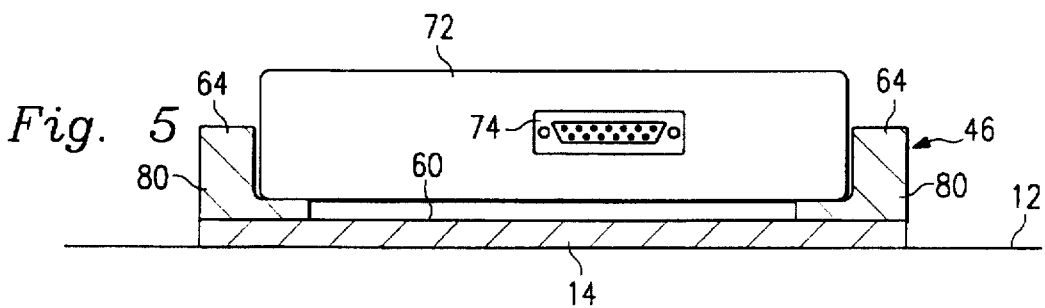
FIG. 5 is an end view taken from the position of section line 2—2 of FIG. 1 of another alternative receiver that is form by positioning attachments on the base and shows a portable computer supported by the attachments.

In FIG. 5, the receiver 46 is formed by positioning removable attachments 80 on the sides of the base 14 to form the sidewalls 64 as shown. The attachments 80 may be removably attached to base 14 by any convenient method, such as screws, friction fittings, mating tabs and slots, and the like, as known to those skilled in the art. Various attachments 80 having different dimensions can be provided to receive a variety of portable computers 72.

Figure 6:
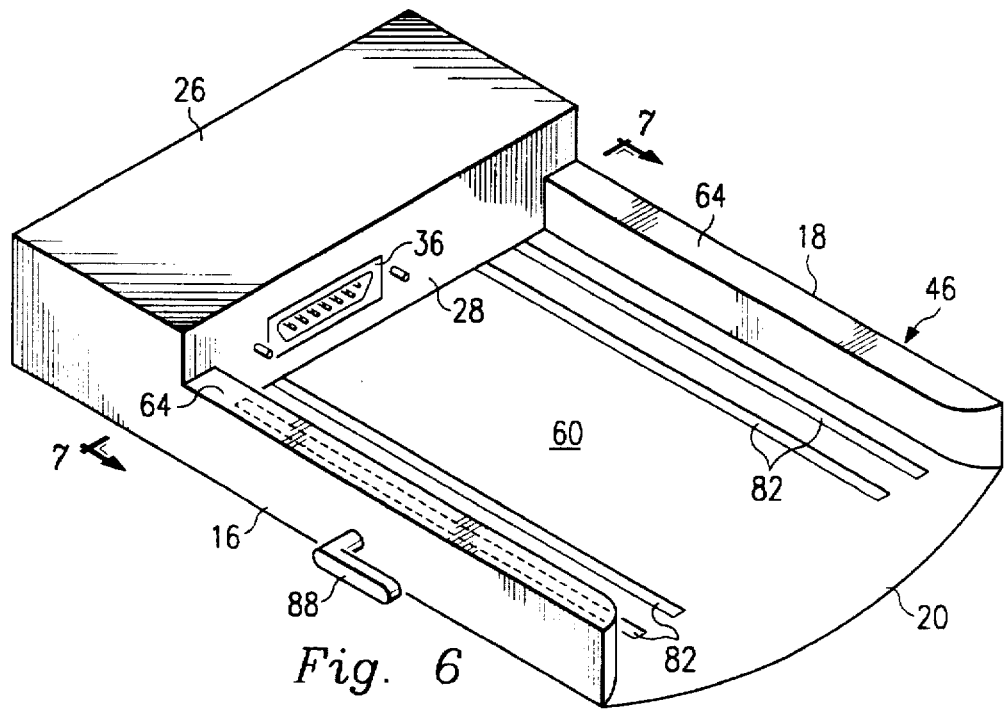
FIG. 6 is a perspective view of a receiver having extendable members positioned in its floor for supporting a portable computer.

In FIG. 6, an alternate embodiment of the docking apparatus of the present invention is shown. The receiver 46 is shown as a hollow member having slots 82 positioned in the floor 60 of the receiver 46. The slots 82 are positioned for extension of inner extendable members 84 and outer extendable members 86 (shown in FIG. 7) upwardly through the floor 60 of the receiver 46. The receiver 46 with members 84 and 86 retracted is adapted to receiver a portable computer of a size compatible with the sidewalls 64 and the floor 60 of the receiver 46 as configured.

Figure 7:
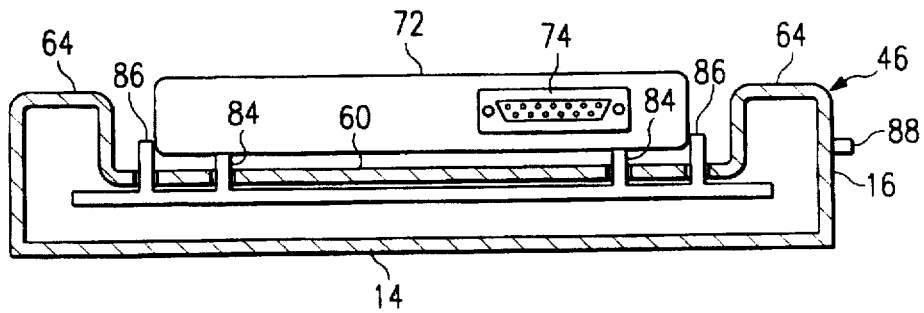
FIG. 7 is a cross sectional end view from section line 7—7 of FIG. 6 showing the extendable members in an extended position to support a portable computer.
Figure 8:
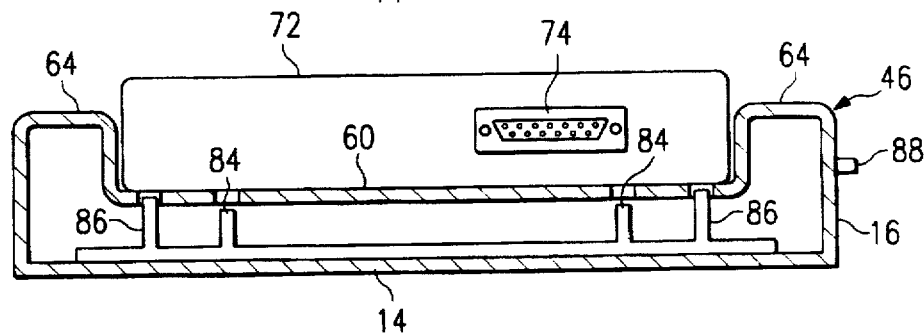
FIG. 8 is a cross sectional end view from section line 7—7 of FIG. 6 showing the extendable members in a retracted position to support a different sized portable computer.

In FIG. 7, extendable members 84 and 86 have been extended to support the portable computer 72 in the receiver 46. The extendable members 84 and 86 may be extended by any suitable mechanical or electromechanical means and are activated by a switch 88, shown on the side 16 of the receiver 46. In FIG. 8, a portable computer 72 is shown positioned in the receiver 46 with the extendable members 84 and 86 in a retracted position to accommodate a larger portable computer 72.

Figure 9:
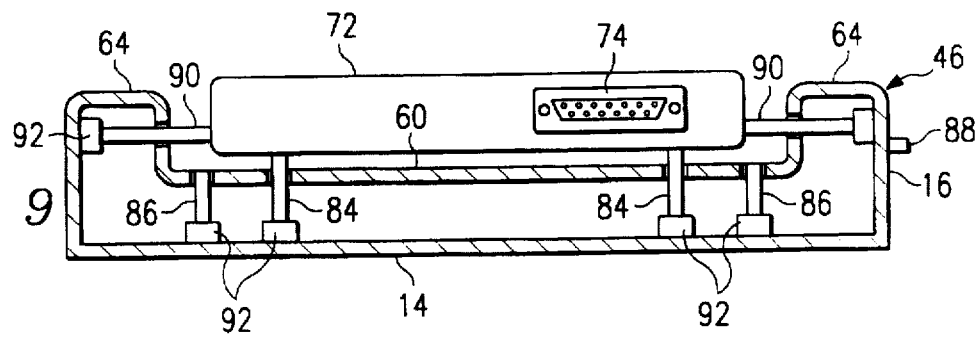
FIG. 9 is a cross sectional end view from section line 7—7 of FIG. 6 of an alternative embodiment of the apparatus of FIG. 6 wherein extendable members are also positioned in the sides of the receiver.

In FIG. 9, an alternate embodiment of the receiver 46 of FIG. 6 is shown. In this embodiment, horizontally extendable members 90 are positioned in the sidewalls 64. In this embodiment, the extendable members 84, 86 and 90 may be extended for variable distances to accommodate various portable computers 72 in place. Desirably, the extendable members 84, 86 and 90 are rails which are adapted to slidably engage the sidewalls and bottom of the portable computer 72 to position it for mating engagement of the connector 74 with the connector 36. The extendable members 84, 86 and 90 may be moved into a desired position by electromechanical devices 92 which may be controlled manually by the switch 88 or by a computer program designed to position the extendable rails 84, 86 and 90 in desired positions to accommodate different external portable computer configurations.

Figure 10:
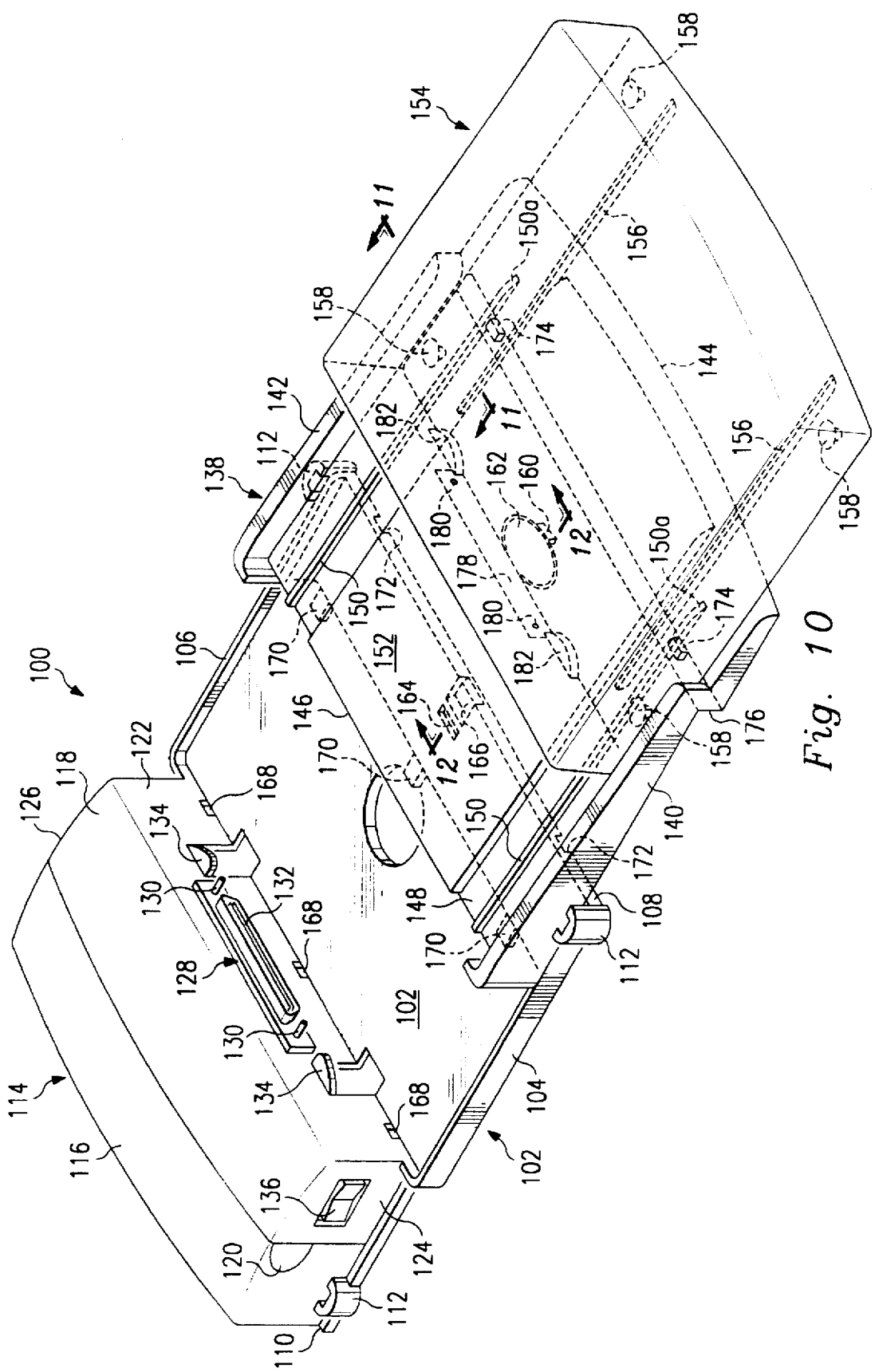
FIG. 10 is a perspective view of an alternative embodiment of the docking apparatus of the present invention.

Referring now to FIG. 10, the reference numeral 100 referes to a docking apparatus of an alternative embodiment of the present invention. The docking apparatus 100 comprises a base 102 having a sidewall 104, a sidewall 106, a front end 108 and a rear end 110. Like the base 14, the base 102 may be formed as a framework or as a solid member, as shown. Fittings 112 are optionally provided on the base 102 for mounting a monitor stand (not shown) above the docking apparatus 100.

An electronics housing 114 is provided which includes the electrical components (not shown) necessary to achieve electrical connection of a portable computer with peripheral equipment or the like. The electronics housing 114 includes a rear portion 116 and a front portion 118. The rear portion 116 may be removably attached to the base 102 and to the front portion 118 by any convenient method, such as mating tabs and slots, and the like, as known to those skilled in the art, and contains depressions 120 for facilitating such removal. The front portion 118 of the electronics housing 114 includes a front end 122, a side 124 and a side 126. End 122 supports a connector 128 which includes guide pins 130 and connector pins 132. Ejectors 134 extend from within the electronics housing 114 through the end 122 to eject portable computers from engagement with the connector 128 when desired. The ejectors 134 may be mechanical or electromechanical and are operated by a switch or lever 136, shown on the side 124 of the front portion 118 of the electronics housing 114.

Figure 11:
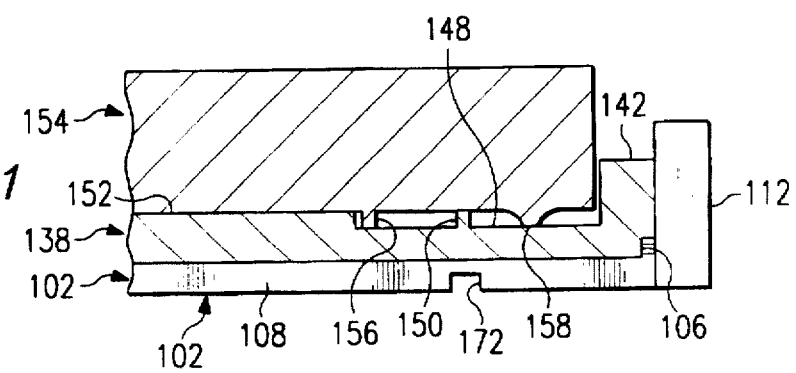
FIG. 11 is an enlarged, cross-sectional view from section line 11—11 of FIG. 10 showing a detail of the engagement mechanism between the base and receiver.

A receiver 138 having a sidewall 140, a sidewall 142, a front end 144 and a rear end 146, is positioned for mounting on the base 102 such that the sidewalls 140 and 142 of the receiver 138 matingly engage with the sidewalls 104 and 106 of the base 102 as shown in FIG. 11. The receiver 138 includes a floor 148, positioned on which are rails 150, each having a sloped leading edge 150a, and a raised surface 152 for receiving a portable computer 154 onto the receiver 138. The portable computer 154 has corresponding rails 156 and feet 158 extending downwardly therefrom to further facilitate the entry and positioning of the portable computer 154 onto the receiver 138 as shown in FIG. 11.

Figure 12:
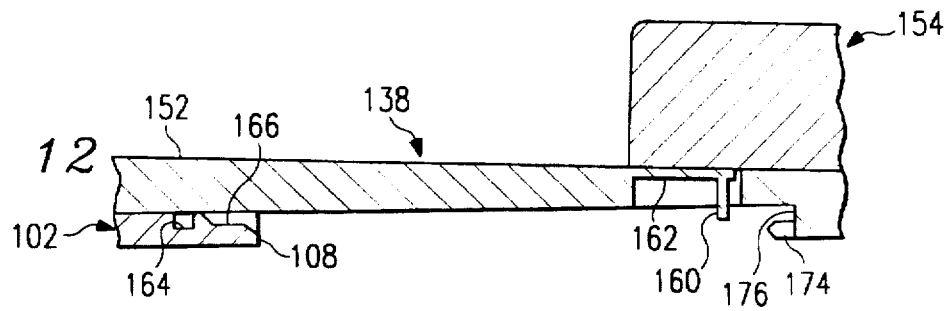
FIG. 12 is an enlarged, cross-sectional view from section line 12—12 of FIG. 10 showing a detail of the mating engagement of the components of the invention.

The receiver 138 as shown in FIG. 10 is maintained in position on the base 102 not only through engagement of the sidewalls 104 and 106 of the base 102, but (referring to both FIG. 10 and FIG. 12) by a locking tab 160 that extends downwardly from a circular partial cutout 162 in the floor 148 of the receiver 138, that is adapted for engagement with a slot 164 positioned near the front end 108 of the base 102 behind a sloped surface 166. In addition, a plurality of openings 168 are provided in the front end 122 of the electronics housing 114 adjacent the base 102 to receive tabs 170 horizontally extending from the rear end 146 of the receiver 138 to further secure the receiver 138 in position on the base 102. Moreover, a plurality of slots 172 are provided in the front end 108 of the base 102 to receive tabs 174 horizontally extending from a shoulder 176 formed on the underside of the receiver 138 as shown in FIG. 10 and FIG. 12. When engaged, the shoulder 176 engages the front end 108 of the base 102 to further facilitate the engagement and positioning of the receiver 138 on the base 102.

The portable computer 154 has a portable computer connector 178 positioned on its rear end for mating engagement with the connector 128. The connector 178 contains receptacles 180 for the guide pins 130 and receptacles (not shown) for the connector pins 132. The pins and receptacles could be reversed between the connector 128 and the connector 178. If necessary, the portable computer 154 may also have depressions 182 on its rear end for mating engagement with the ejectors 134.

In operation, the receiver 138 is engaged with the base 102 by sliding the receiver 138 onto the base 102 between the sidewalls 104 and 106 of the base. The mating of the sidewalls 140 and 142 of the receiver 138 with the sidewalls 104 and 106 of the base 102 direct the tabs 170 into the openings 168 and the tabs 174 into the slots 172. Disengagement is prevented by the locking tab 160 that engages the slot 164 after sliding up the surface 166. The portable computer 154 is then positioned on the receiver 138 by sliding the portable computer 154 onto the sloped edges 150a of the rails 150 between the sidewalls 140 and 142 of the receiver. The mating of the sidewalls, the rails 156 of the portable computer 154 with the raised surface 152 of the receiver 138, and the corresponding heights of the rails 150 of the receiver 138 and the feet 158 of the portable computer 154, direct the connector 178 into engagement with the connector 128 to connect the portable computer 154 with the docking apparatus 100 and the associated peripheral equipment (not shown).

Disengagement of the portable computer 154 from the docking apparatus 100 is accomplished by activating the switch 136, which in turn activates the ejectors 134 that urge against the rear end of the portable computer 154 to separate the connectors 128 and 178. The receiver 138 is disengaged from the base 102 by lifting up on the cutout 162 to lift the locking tab 160 out of the slot 164. The receiver 138 can then be slid off of the base 102 to make room for the next receiver.

By the use of a plurality of receivers 138, each adapted to be received by the base 102 but adapted to receive different portable computers 154 by varying the width of the sidewalls 140 and 142, the height and location of the rails 150, and the height and width of the raised surface 152 to matingly engage with the sides and bottom of the portable computer, including the rafts 156 and the feet 158, to position the portable computer connector 178 in position for mating engagement with the docking apparatus connector 128, a large number of portable computers from a common family of portable computers can be docked in the same docking apparatus 100.

In the use of the docking apparatus of the present invention, a plurality of receivers can be provided for mounting on the base to accommodate selected portable computers based upon the external configuration of the portable computers. Many manufacturers of portable computers find it desirable to change the external dimensions of the portable computers because of varied capabilities in the portable computer, fabrication at different facilities, and the like. While such changes may be necessitated by the internal arrangement of electronic components and the like, it is possible to position a common portable computer connector on all such portable computers. Further, while it is desirable to be able to move the location of the portable computer connector to a certain extent, it is also feasible to locate the connector generally in a selected position such as toward the left and generally toward the top of the rear of the portable computer. While the location may not be exactly the same on each portable computer model, the location is in the same general area and suitable for mating with the docking apparatus connector when the portable computer is suitably positioned.

By the use of the docking apparatus of the present invention, a large number of selected members of a family of portable computers can be docked in a common docking apparatus by providing a receiver which is adapted to receive the desired portable computer and which can be positioned on the base of the docking apparatus. Alternatively, as discussed, attachments can be used or extendable rafts can be used.

Having thus described the present invention by reference to its preferred embodiments, it is pointed out that many variations and modifications are possible within the scope of the present invention. Such variations and modifications may appear obvious and desirable to those skilled in the art based upon the foregoing description of preferred embodiments. For example, and with particular reference to the docking apparatus 100 shown in FIG. 10, the rails 150 of the receiver 148 could be eliminated or the sidewalls 140 and 142 shortened in length or even eliminated in some cases. As the rails 156 provide left and right alignment, the sidewalls 140 and 142 are not required to properly align the connectors and can thus be eliminated, or simply shortened to still provide course alignment. In addition, the lever 136 could be positioned near the front end of the base 102 to facilitate its access. Moreover, the connectors could be repositioned on both the portable computer and the docking apparatus to allow docking to occur at different locations besides at the rear of the portable computer. Further modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A docking apparatus for docking selected portable computers of dimensions, each of the portable computers having a front end and a rear end, a first and a second side, a top and a bottom and a portable computer connector, the docking apparatus comprising:

a base having a first end and a second end and a receptacle;

an electronics enclosure positioned on the base between the first end and the second end, the electronics enclosure having a first end positioned to extend generally perpendicularly between a first side to a second side of the base and generally perpendicularly upwardly from the base to form a wall;

a docking apparatus connector positioned on the wall and configured to matingly engage the portable computer connector;

a receiver for at least one of the portable computers, the receiver including a manual lock positioned for engagement with the receptacle of the base when the receptacle is positioned on the base thereby to removably secure the receiver to the base, the receiver being configured to matingly engage the bottom of one of the portable computers to position the one of the portable computers for mating engagement of the portable computer connector and the docking apparatus connector.

2. The docking apparatus of claim 1 comprising a plurality of interchangeable receivers each comprising a manual lock for engagement with the receptacle of the base thereby to removably secure the receiver to the bases wherein each of the receivers is configured to matingly engage and position a different one of the selected portable computers.

3. The docking apparatus of claim 1 wherein the electronics enclosure further includes ejectors for disengagement of the portable computer connector from the docking apparatus connector.

* * * * *